(12) United States Patent
Mock

(10) Patent No.: US 9,089,789 B2
(45) Date of Patent: Jul. 28, 2015

(54) IN SITU PROCESS FOR MERCURY REMOVAL

(75) Inventor: Jon Marvin Mock, Katy, TX (US)

(73) Assignee: Phillips 66 Company, Houston, TX (US)

( * ) Notice: Subject to any disclaimer, the term of this patent is extended or adjusted under 35 U.S.C. 154(b) by 792 days.

(21) Appl. No.: 13/218,141

(22) Filed: Aug. 25, 2011

(65) Prior Publication Data

US 2012/0073811 A1 Mar. 29, 2012

Related U.S. Application Data

(60) Provisional application No. 61/386,877, filed on Sep. 27, 2010.

(51) Int. Cl.

| E21B 43/38 | (2006.01) |
|---|---|
| C09K 8/52 | (2006.01) |
| B01D 15/00 | (2006.01) |
| B01J 20/02 | (2006.01) |
| B01J 20/06 | (2006.01) |
| B01J 20/32 | (2006.01) |
| C09K 8/80 | (2006.01) |
| C10G 25/00 | (2006.01) |

(52) U.S. Cl.
CPC .............. *B01D 15/00* (2013.01); *B01J 20/02* (2013.01); *B01J 20/0285* (2013.01); *B01J 20/06* (2013.01); *B01J 20/3204* (2013.01); *B01J 20/3236* (2013.01); *C09K 8/80* (2013.01); *C10G 25/00* (2013.01); *C10G 25/003* (2013.01); *E21B 43/38* (2013.01); *B01D 2253/1124* (2013.01); *B01D 2253/1128* (2013.01); *B01D 2253/25* (2013.01); *B01D 2257/602* (2013.01); *C10G 2300/205* (2013.01); *C10G 2300/4037* (2013.01)

(58) Field of Classification Search
CPC ... E21B 43/26; E21B 43/40; B01D 2257/602; B01D 53/64; C09K 8/62; C09K 8/52
USPC ............. 166/279, 280.1; 405/129.65, 128.15, 405/128.45
See application file for complete search history.

(56) References Cited

U.S. PATENT DOCUMENTS

| 4,094,777 A | 6/1978 | Sugier et al. |
|---|---|---|
| 4,909,926 A | 3/1990 | Yan |

(Continued)

FOREIGN PATENT DOCUMENTS

| EP | 0342898 | 11/1989 |
|---|---|---|
| EP | 0484233 | 5/1992 |
| EP | 1234947 | 8/2002 |
| GB | 1063400 | 3/1967 |
| GB | 2463115 | 3/2010 |
| WO | 2007041553 | 4/2007 |
| WO | 2009101429 | 8/2009 |

OTHER PUBLICATIONS

PCT Notification of Transmittal of the International Search Report and the Written Opinion of the International Search Authority, or the Declaration, International Application No. PCT/US2011/049175; International Filing Date Aug. 25, 2011; 15 pages.

*Primary Examiner* — Catherine Loikith
(74) *Attorney, Agent, or Firm* — Phillips 66 Company

(57) ABSTRACT

Methods and system relate to in-situ treatment of fluid to remove a heavy metal, such as mercury. The treatment utilizes a sorbent injected into a wellbore and disposed in a flow path of the fluid being produced to above ground. The mercury retained by the sorbent upon contact with the fluid may remain within a reservoir from which the fluid is recovered.

18 Claims, 3 Drawing Sheets

(56) References Cited

U.S. PATENT DOCUMENTS

| | | |
|---|---|---|
| 5,196,124 A | 3/1993 | Connor et al. |
| 5,728,302 A | 3/1998 | Connor et al. |
| 5,730,550 A * | 3/1998 | Andersland et al. ....... 405/128.6 |
| 7,585,132 B2 * | 9/2009 | Imbrie .................... 405/128.75 |
| 2005/0230659 A1 | 10/2005 | Hampden-Smith et al. |
| 2007/0297858 A1 * | 12/2007 | Imbrie .................... 405/128.45 |
| 2009/0155148 A1 | 6/2009 | Kanazirev |
| 2011/0162837 A1 | 7/2011 | O'Malley et al. |

* cited by examiner

IN SITU PROCESS FOR MERCURY REMOVAL

CROSS-REFERENCE TO RELATED APPLICATIONS

This application is a non-provisional application which claims the benefit of and priority to U.S. Provisional Application Ser. No. 61/386,877 filed Sep. 27, 2010, entitled "In Situ Process for Mercury Removal," which is hereby incorporated by reference in its entirety.

STATEMENT REGARDING FEDERALLY SPONSORED RESEARCH OR DEVELOPMENT

None

FIELD OF THE INVENTION

Embodiments of the invention relate to methods and systems for subsurface removal of mercury from fluids being produced to surface.

BACKGROUND OF THE INVENTION

Produced fluids including hydrocarbon gases and oil often contain unacceptable levels of heavy metals such as mercury. Presence of the mercury in the fluids can limit options for materials used in fluid handling facilities due to corrosiveness and can cause problems with downstream processing units as well as health and environmental issues if released as waste. Common approaches to remove mercury in such produced fluids utilize treatments for the fluids once the fluids are recovered from subterranean reservoirs and brought to a surface of the earth.

Surface systems often employ mercury treatment vessels packed with sorbent for the mercury. In operation, the fluid passes through the vessels and contacts the sorbent for removal of the mercury. Various compositions provide the sorbent loaded into the treatment vessels.

Problems associated with past techniques for mercury removal include corrosion hazards associated with materials, such as aluminum used to make heat exchangers, that the fluid contacts before exiting the mercury treatment vessels. The mercury located at the surface also presents safety risks from occupational exposure. Further, capital costs of the treatment vessels and operating costs with hazardous waste shipment and disposal of the mercury and contaminated spent equipment make prior approaches for the mercury removal at the surface expensive.

Therefore, a need exists for methods and systems suitable for treatment of fluids to remove heavy metals.

BRIEF SUMMARY OF THE DISCLOSURE

In one embodiment, a method of removing mercury from a fluid includes injecting a solid sorbent for heavy metal into a wellbore intersecting a subterranean reservoir containing hydrocarbon products. Passing the hydrocarbon products into contact with the sorbent results in sorption of heavy metal from the hydrocarbon products. Further, the method includes recovering the products to above ground from the wellbore after the products pass into contact with the sorbent.

According to one embodiment, a method includes fracturing a subterranean formation to generate fractures with a fluid containing a solid sorbent for heavy metal. Passing hydrocarbon products into contact with the sorbent disposed in the fractures results in sorption of heavy metal from the hydrocarbon products. The method further includes recovering the products produced from the formation and treated to remove the heavy metal by the contact with the sorbent.

For one embodiment, a method includes packing part of a wellbore intersecting a subterranean reservoir containing hydrocarbon products with solid sorbent for mercury. During production, the products contact the sorbent disposed underground. The contact results in sorption of the mercury from the hydrocarbon products prior to above ground removal of the products from the wellbore.

BRIEF DESCRIPTION OF THE DRAWINGS

A more complete understanding of the present invention and benefits thereof may be acquired by referring to the following description taken in conjunction with the accompanying drawings.

DETAILED DESCRIPTION

Figure 1:
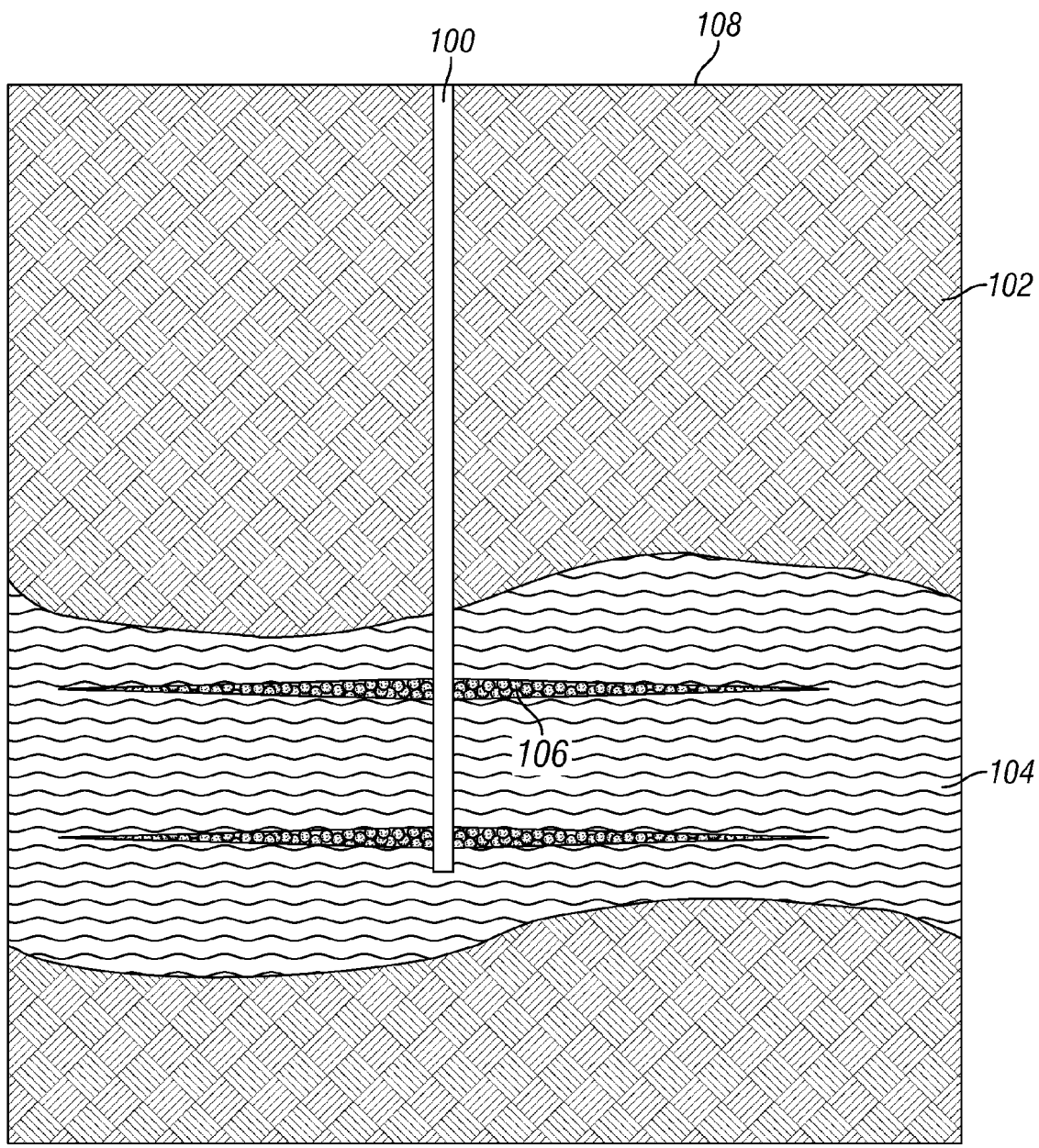
FIG. 1 is a schematic of a well completed by generating fractures that contain a solid sorbent for sorption of heavy metal, according to one embodiment of the invention.

Turning now to the detailed description of the preferred arrangement or arrangements of the present invention, it should be understood that the inventive features and concepts may be manifested in other arrangements and that the scope of the invention is not limited to the embodiments described or illustrated. The scope of the invention is intended only to be limited by the scope of the claims that follow.

Embodiments of the invention relate to in-situ treatment of fluid for heavy metal removal. The treatment utilizes sorbent injected into a wellbore and disposed in a flow path of the fluid being produced to above ground. The mercury retained by the sorbent upon contact with the fluid may remain within a reservoir from which the fluid is recovered.

Examples of the fluid include hydrocarbon streams of gas and/or oil. In some embodiments, the fluid may contain one or more of arsenic, beryllium, lead, cadmium, chromium, nickel, zinc, mercury and barium as the heavy metal that a sorbent composition sorbs during treatment of the fluid. While described herein with reference to mercury removal, the treatment may remove other ones of the heavy metals. As used herein, "mercury" refers to elemental mercury and/or mercury within or from compounds, such as mercuric chloride, mercury oxide and combinations thereof, containing mercury and at least one other element. In some embodiments, the treatment removes at least 90%, at least 95% or at least 99% of the mercury from the fluid.

Various suitable compositions enable sorption of the mercury. In some embodiments, the sorbent includes a substrate or support material that is porous and impregnated with a compound active on the support material for sorption of the mercury. Examples of the support material include bauxite, zeolites, clays, activated carbon, alumina ($Al_2O_3$), silica ($SiO_2$), titania ($TiO_2$), zirconia ($ZrO_2$) and combinations thereof.

Selection of the support material may depend on structural strength thereof as some applications described herein utilize the sorbent as proppant in fracturing-fluid and the proppant requires sufficient strength to hold open resulting fractures. Thus, conventional proppant may provide the support material that is impregnated with the compound active on the proppant for sorption of the mercury. In some embodiments, the fracturing-fluid contains a mixture of the sorbent and proppant nonreactive with the mercury.

For some embodiments, the sorbent includes the support material impregnated with one of silver, copper, tin and zinc in one of metallic, oxide and sulfide forms. Such compositions have shown effectiveness in sorption of mercury. Particular examples of the sorbent thus include bauxite, for example, impregnated with copper oxide (CuO), copper sulfide (CuS), zinc oxide (ZnO), silver (Ag) or silver sulfide ($Ag_2S$). With respect to preparing the sorbent loaded with copper or zinc sulfide, sulfiding of supported metal oxides such as the copper or zinc oxides to form the copper or zinc sulfide may occur before or after injection of the sorbent into the wellbore and may rely on presence of hydrogen sulfide in the fluid. In some applications at temperatures below about 150°, a sulfur loaded support material such as activated carbon impregnated with between about 1 weight percent and about 30 weight percent sulfur may define the sorbent without the sulfur being loaded onto the support material as metal sulfide.

FIG. 1 illustrates an exemplary arrangement for the in-situ treatment. The arrangement includes a borehole 100 drilled into a formation 102 to intersect a subterranean reservoir 104 containing the fluid to be produced. Well completion includes generating fractures that contain a solid sorbent 106 for mercury sorption. Pumping of the fracturing-fluid into the borehole 100 at sufficient pressure and rate causes the fractures to form, spread and open. The fractures induced by the pressure extend away from the borehole 100 and through the reservoir 104. The fracturing-fluid mixed with the sorbent 106 carries the sorbent 106 into the fractures. The proppant and/or sorbent 106 keep the fracture open once hydraulic pressure from the pumping of the fracturing-fluid is removed. The sorbent 106 thus remains in place within the fractures once injected.

During production operations, the fluid passes into contact with the sorbent 106 resulting in sorption of the mercury from the fluid. The fluid then flows through the borehole 100 to surface 108 where the fluid is recovered above ground upon exiting the borehole 100. Implementation of the fracture with the sorbent 106 disposed therein enables mercury removal from the fluid even if the fractures provide no stimulating benefit to production rate.

Figure 2:
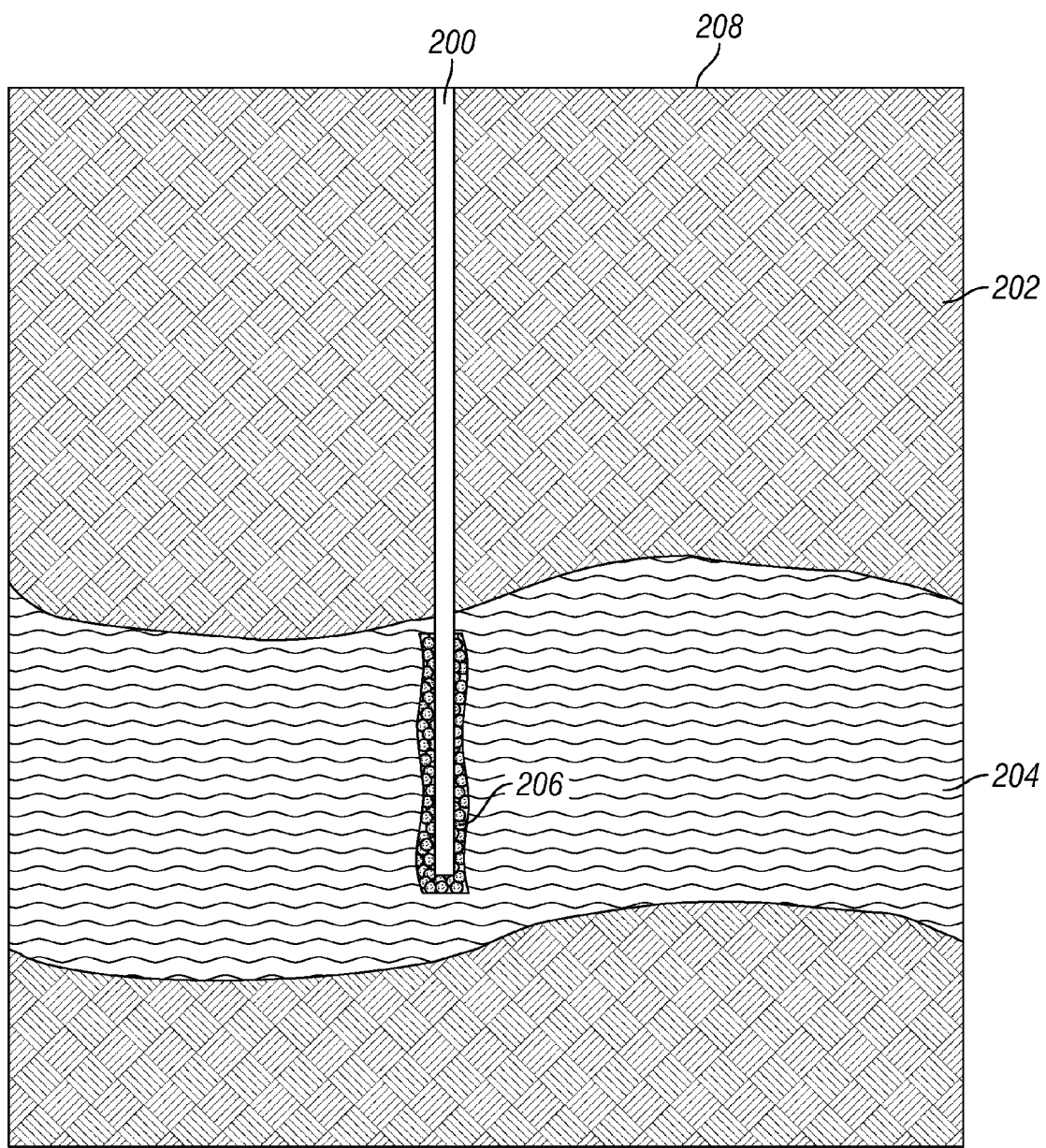
FIG. 2 is a schematic of a well completed with a packing that contains a solid sorbent for sorption of heavy metal, according to one embodiment of the invention.

FIG. 2 shows another exemplary arrangement for the in-situ treatment of the fluid. This arrangement includes a wellbore 200 extending into a formation 202 with a reservoir 204 of the fluid. A packing disposed within a drilled length of the wellbore 200 contains a solid sorbent 206 for mercury sorption. In some embodiments, the sorbent 206 fills an annular area around perforated tubing run in the wellbore 200 and through which the fluid enters for flowing toward surface 208. A flow path of the fluid from the reservoir 204 to the wellbore 200 or the surface 208 thus may traverse through the sorbent 206 that is in fluid communication with the wellbore 200 and the reservoir 204. The sorbent 206 may function to support and stabilize openhole completions or walls of the reservoir 204 where drilled to form the wellbore 200.

The fluid passes into contact with the sorbent 206 during production and results in sorption of the mercury from the fluid. The fluid then flows through the wellbore 200 toward the surface 208. The fluid that is recovered above ground upon exiting the wellbore 200 contains a lower mercury concentration than the fluid in the reservoir 204 prior to contact with the sorbent 206.

Figure 3:
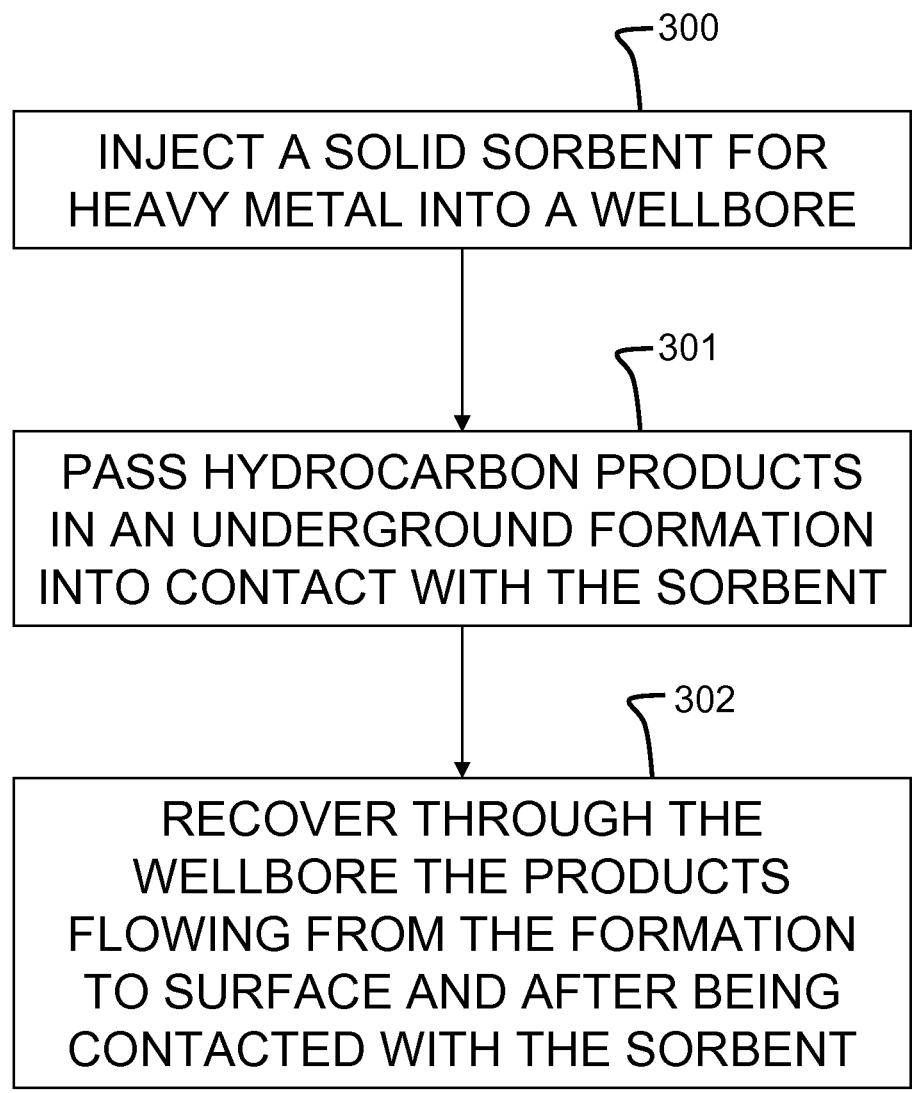
FIG. 3 is a flow chart illustrating a method of removing heavy metal from hydrocarbon products as the products are produced to surface, according to one embodiment of the invention.

FIG. 3 illustrates a flow chart for a method of removing heavy metal from hydrocarbon products as the products are produced to surface. In an initial sorbent placement step 300, injection of sorbent for mercury into a wellbore disposes the sorbent in fluid communication with inflow of the products into the wellbore from an underground formation. Treatment step 301 includes passing the products into contact with the sorbent located underground in the placement step 300. Next, the products contacted with the sorbent to remove mercury from the products flow to the surface through the wellbore, in a recovery step 302.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

The invention claimed is:

1. A method, comprising:
    injecting a solid sorbent for heavy metal into a wellbore intersecting a subterranean reservoir containing hydrocarbon products;
    passing the hydrocarbon products into contact with the sorbent resulting in sorption of heavy metal from the hydrocarbon products; and
    recovering the products to above ground from the wellbore after the products pass into contact with the sorbent,
    wherein the solid sorbent is impregnated with the group selected of: silver, copper, or combinations thereof, for the sorption of mercury, after the injection of the sorbent into the wellbore.

2. The method according to claim 1, further comprising generating formation fractures within the reservoir and into which the sorbent is disposed.

3. The method according to claim 1, further comprising generating formation fractures within the reservoir and into which the sorbent is disposed, wherein the sorbent includes impregnated proppant.

4. The method according to claim 1, wherein the sorbent is packed within a drilled length of the wellbore.

5. The method according to claim 1, wherein the sorbent includes one of supported silver, copper, tin and zinc in one of metallic, oxide and sulfide forms.

6. The method according to claim 1, wherein the sorbent includes copper oxide.

7. The method according to claim 1, wherein the sorbent includes copper oxide impregnated on bauxite.

8. The method according to claim 1, wherein the sorbent includes copper sulfide.

9. The method according to claim 1, wherein the sorbent is disposed in formation fractures within the reservoir and is impregnated proppant formed from bauxite.

10. The method according to claim 1, wherein the contact of the products with the sorbent results in sorption of one of arsenic, beryllium, lead, cadmium, chromium, nickel, zinc, mercury and barium from the products.

11. The method according to claim 1, wherein the sorbent includes a substrate formed from one of zeolite, silica, alumina, titania, zirconia, activated carbon, clay and bauxite and impregnated with a compound active on the substrate for sorption of mercury.

12. A method, comprising:
fracturing a subterranean formation to generate fractures with a fluid containing a solid sorbent for heavy metal;
passing hydrocarbon products into contact with the sorbent disposed in the fractures resulting in sorption of heavy metal from the hydrocarbon products; and
recovering the products produced from the formation and treated to remove the heavy metal by the contact with the sorbent,
wherein the solid sorbent is impregnated with the group selected of: silver, copper, or combinations thereof for the sorption of mercury, after the injection of the sorbent into the wellbore.

13. The method according to claim 12, wherein the sorbent includes proppant impregnated with one of silver, copper, tin and zinc in one of metallic, oxide and sulfide forms.

14. The method according to claim 12, wherein the fluid contains a mixture of the sorbent of supported silver, copper, tin and zinc in one of metallic, oxide and sulfide forms and proppant nonreactive with the heavy metal.

15. The method according to claim 12, wherein the hydrocarbon products are gaseous.

16. A method, comprising:
packing part of a wellbore intersecting a subterranean reservoir containing hydrocarbon products with solid sorbent for mercury; and
producing the hydrocarbon products, wherein during the producing the products contact the sorbent disposed underground resulting in sorption of the mercury from the hydrocarbon products prior to above ground removal of the products from the wellbore,
wherein the sorbent is impregnated with the group selected of: silver, copper, or combinations thereof for the sorption of mercury, after the injection of the sorbent into the wellbore.

17. The method according to claim 16, wherein the sorbent is packed within a drilled length of the wellbore in an annular area around tubing through which the products flow.

18. The method according to claim 16, wherein the sorbent includes a support material impregnated with one of silver, copper, tin and zinc in one of metallic, oxide and sulfide forms.

\* \* \* \* \*